(12) United States Patent
Pirner

(10) Patent No.: US 11,204,300 B2
(45) Date of Patent: Dec. 21, 2021

(54) CUP FOR A PIPELINE INSPECTION GAUGE

(71) Applicant: ENTEGRA LLP, Indianapolis, IN (US)

(72) Inventor: Paul Pirner, Mississauga (CA)

(73) Assignee: ENTEGRA LLP, Indianapolis, IN (US)

( * ) Notice: Subject to any disclaimer, the term of this patent is extended or adjusted under 35 U.S.C. 154(b) by 0 days.

(21) Appl. No.: 16/707,221

(22) Filed: Dec. 9, 2019

(65) Prior Publication Data

US 2021/0172821 A1  Jun. 10, 2021

(51) Int. Cl.
*G01M 3/28* (2006.01)
*B08B 9/055* (2006.01)
*G01M 3/00* (2006.01)

(52) U.S. Cl.
CPC .......... *G01M 3/2823* (2013.01); *B08B 9/0557* (2013.01); *G01M 3/005* (2013.01)

(58) Field of Classification Search
CPC .... G01M 3/005; G01M 3/246; G01M 3/2823; B08B 9/0557
See application file for complete search history.

(56) References Cited

U.S. PATENT DOCUMENTS

| | | | |
|---|---|---|---|
| 3,704,478 A | 12/1972 | Vernooy | |
| 3,732,434 A * | 5/1973 | French | G01M 3/2823 307/118 |
| 4,275,475 A | 6/1981 | Schwartz et al. | |
| 4,365,379 A | 12/1982 | Neff | |
| 4,663,795 A | 5/1987 | Neff | |
| 4,797,239 A | 1/1989 | Cho | |
| 5,265,303 A | 11/1993 | Neff | |
| 5,295,279 A | 3/1994 | Cooper | |
| 6,381,797 B1 * | 5/2002 | Filippovitch | F16L 55/46 15/104.061 |
| 10,458,822 B2 | 10/2019 | Pirner | |
| 2017/0261147 A1 * | 9/2017 | Walter | F16L 55/44 |
| 2019/0078721 A1 | 3/2019 | Pimer | |

* cited by examiner

*Primary Examiner* — Erika J Villaluna
(74) *Attorney, Agent, or Firm* — Maginot, Moore & Beck LLP

(57) ABSTRACT

An in-line inspection tool for a pipeline comprises a body defining an axis, a sensor module coupled to the body, and a drive cup coupled to the body. The drive cup includes an outer surface with a plurality of axial channels, each of the axial channels including at least one bridge positioned therein that extends circumferentially across the channel.

21 Claims, 9 Drawing Sheets

CUP FOR A PIPELINE INSPECTION GAUGE

FIELD

This application relates to the field of pipeline inspection tools, and particularly to cups for use with smart pipeline inspection gauges.

BACKGROUND

Pipeline systems are an integral component of global energy distribution. There are millions of miles of energy pipelines in the United States alone, delivering trillions of cubic feet of natural gas and Hundreds of billions of ton/miles of liquid petroleum products each year. To ensure the safety of these vast pipeline systems and often to comply with governmental regulations, pipeline operators must frequently service their pipelines and perform periodic inspections to assess pipeline integrity. Mechanical devices referred to as pipeline inspection gauges (which may also be referred to herein as "pigs" or "in-line inspection tools") are often employed to perform these maintenance and inspection functions inside the pipeline. Different types of pigs are used to perform different tasks. These pigs include gauging tool pigs, cleaning pigs, and smart pigs.

Pigs must be capable of passing through pipelines of varying size. The varying size of a pipeline may be intentional in some instances. Pigs are often separated into sections or packages that house specific instrumentation or carry out specific functions. For instance, a pig can include a drive package for propulsion, a gauging plate package to determine smallest pipe diameters, a sensor package for carrying out signal detection for corrosion measurements, a navigational package for determining relative or global position, and a power package for powering any on-board electronics. The packages are tethered to one another via flexible joints that allow the respective packages to pass individually through bends in the pipe.

FIG. 10 depicts an exemplary arrangement for a conventional pipeline pig 100. The pig 100 includes a circumferential pig body 104 defining a central axis 108, a plurality of elastomeric drive cups 110 coupled to the pig body 104, and at least one sensor package 120 coupled to the pig body 104. The pig body 104 is flexible, at least in sections, thus allowing the pig 100 to flex and bend around curves and turns within a pipeline. The drive cups 110 are configured to engage the inner wall of the pipeline and support the pig body 104 centrally within the pipeline. The cups 110 generally include circumferential edges or lips that engage the interior wall of the pipeline and form a sealed/piston-like relationship with the pipeline. Fluid flowing through the pipeline causes a pressure to act against the surfaces of the cups and move the pig 100 upstream through the pipeline. The sensor package 120 includes a plurality of sensors (not shown) which may be arranged in various sections of the pig and are configured take various measurements within the pipeline.

While conventional pipeline pigs such as that shown in FIG. 10 have traditionally been successful in travelling through pipelines of a single diameter (e.g., 6-inch or 8-inch pipelines) such pigs are not always successful in travelling through pipelines with multiple diameters (e.g., both 6-inch and 8-inch). In particular, while the drive cup may have some flexibility, the cup tends to fold and/or bend when compressed into a smaller diameter pipelines, thus resulting in openings between the cup and the inner surface of the pipeline. When openings exist between the cup and the inner surface of the pipeline, the seal is broken and fluid within the pipeline flows through the opening and around the cup. As a result, there is a loss of pressure on the drive cup, and the cup is not propelled through the pipeline in the proper manner.

In view of the foregoing, it would be advantageous a drive mechanism for a pipeline inspection gauge that is capable of properly propelling the device through a pipeline with multiple diameters. It would be of further advantage if the drive mechanism were provided by a relatively simple device such as an improved cup capable of producing a seal along the inner surface of the pipeline across the multiple pipeline dimensions. It would also be advantageous if such a drive mechanism could be produced inexpensively and could be incorporated into new pipeline inspection gauges or retrofitted onto existing gauges.

SUMMARY

In at least one embodiment, an in-line inspection tool for a pipeline comprises a body defining an axis, a sensor module coupled to the body, and a drive cup coupled to the body. The drive cup includes an outer surface with a plurality of axial channels, each of the axial channels including at least one bridge positioned therein that extends circumferentially across the channel.

In at least one embodiment, a drive cup for an in-line inspection tool for a pipeline includes a frustoconical outer surface having a front portion and a rear portion, the front portion defining a smaller diameter than the rear portion. The drive cup further includes a plurality of axial channels defined on the outer surface, each of the axial channels defining a radial depth. Additionally, the drive cup includes a plurality of bridges positioned in each of the axial channels, each of the bridges extending circumferentially across the channel and radially for the depth of the channel.

In at least one embodiment, a method of propelling a pipeline inspection gauge through a pipeline comprises inserting the pipeline inspection gauge into the pipeline, the pipeline inspection gauge including a drive cup having an outer surface with a plurality of axial channels, a first set of bridges extending across the axial channels at a first diameter portion of the outer surface, and a second set of bridges extending across the axial channels at a second diameter portion of the outer surface. The method further comprises engaging the outer surface of the drive cup including the first set of bridges with a first inner surface of the pipeline. The method also comprises allowing the drive cup to move within the pipeline as a result of a fluid pressure on the drive cup. Furthermore, the method comprises engaging the outer surface of the drive cup including the second set of bridges with a second inner surface of the pipeline, wherein the second inner surface of the pipeline is defined by a different diameter than the first inner surface.

The above described features and advantages, as well as others, will become more readily apparent to those of ordinary skill in the art by reference to the following detailed description and accompanying drawings. While it would be desirable to provide an in-line inspection tool that provides one or more of these or other advantageous features, the teachings disclosed herein extend to those embodiments which fall within the scope of the appended claims, regardless of whether they accomplish one or more of the above-mentioned advantages.

DETAILED DESCRIPTION

Figure 1:
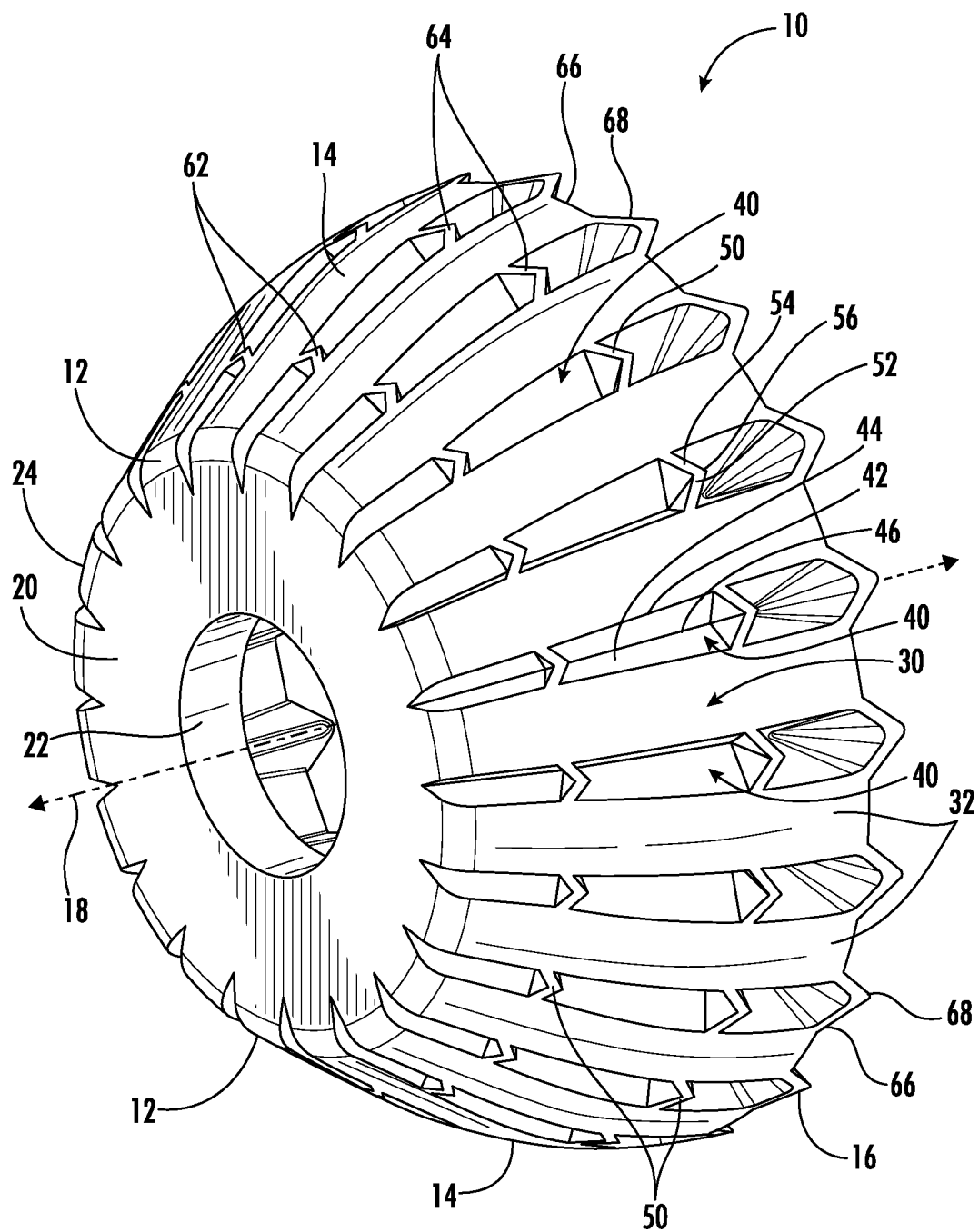
FIG. 1 shows a front perspective view of one embodiment of a drive cup for a pipeline inspection gauge.
Figure 2:
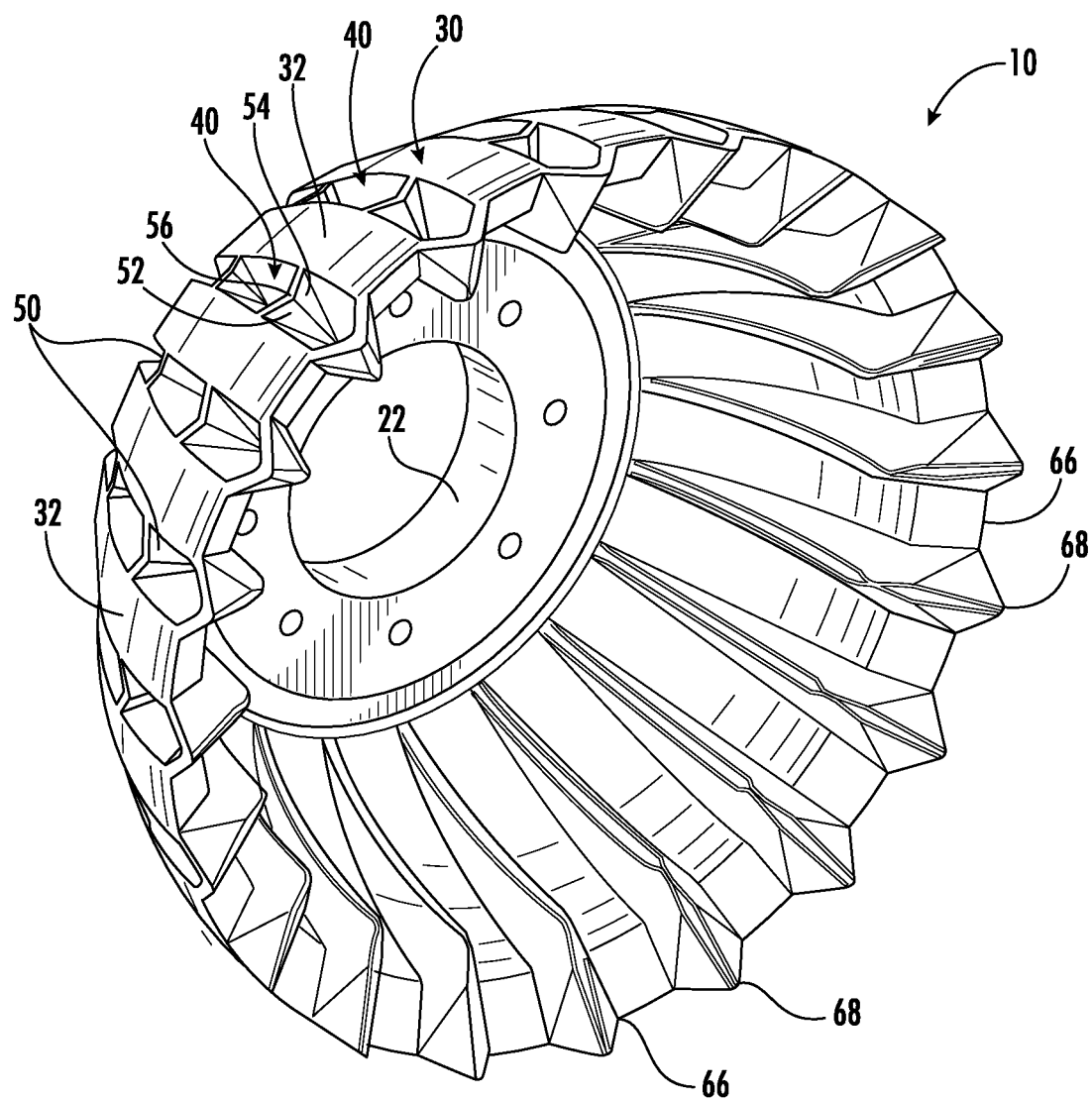
FIG. 2 shows a rear perspective view of the drive cup of FIG. 1.
Figure 3:
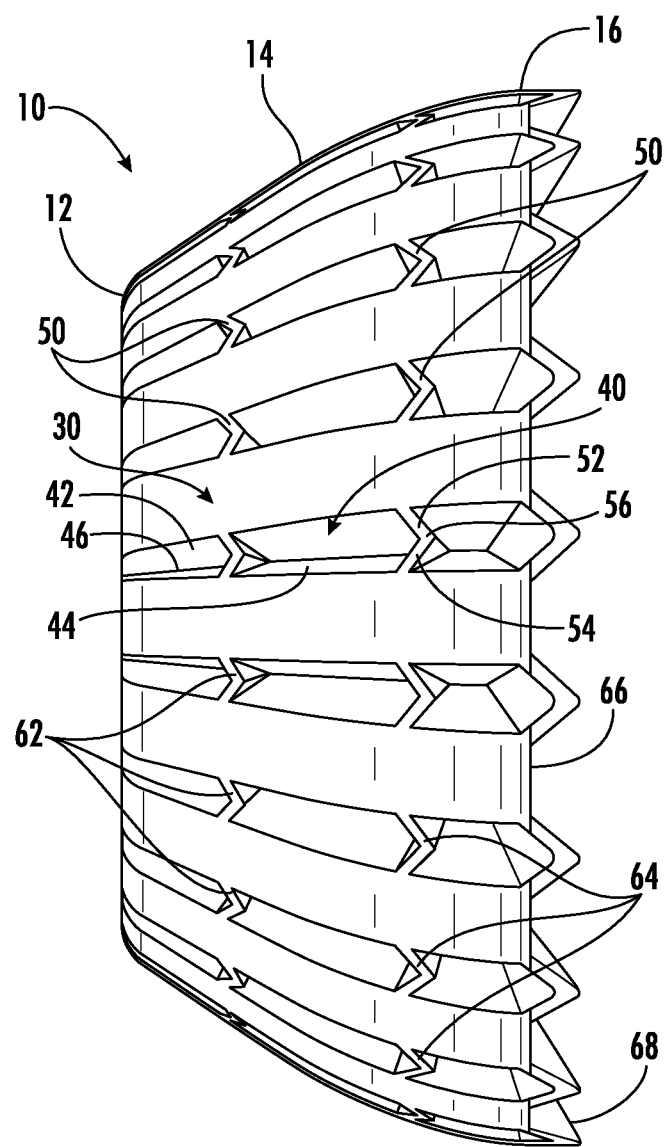
FIG. 3 shows a side view of the drive cup of FIG. 1.
Figure 4:
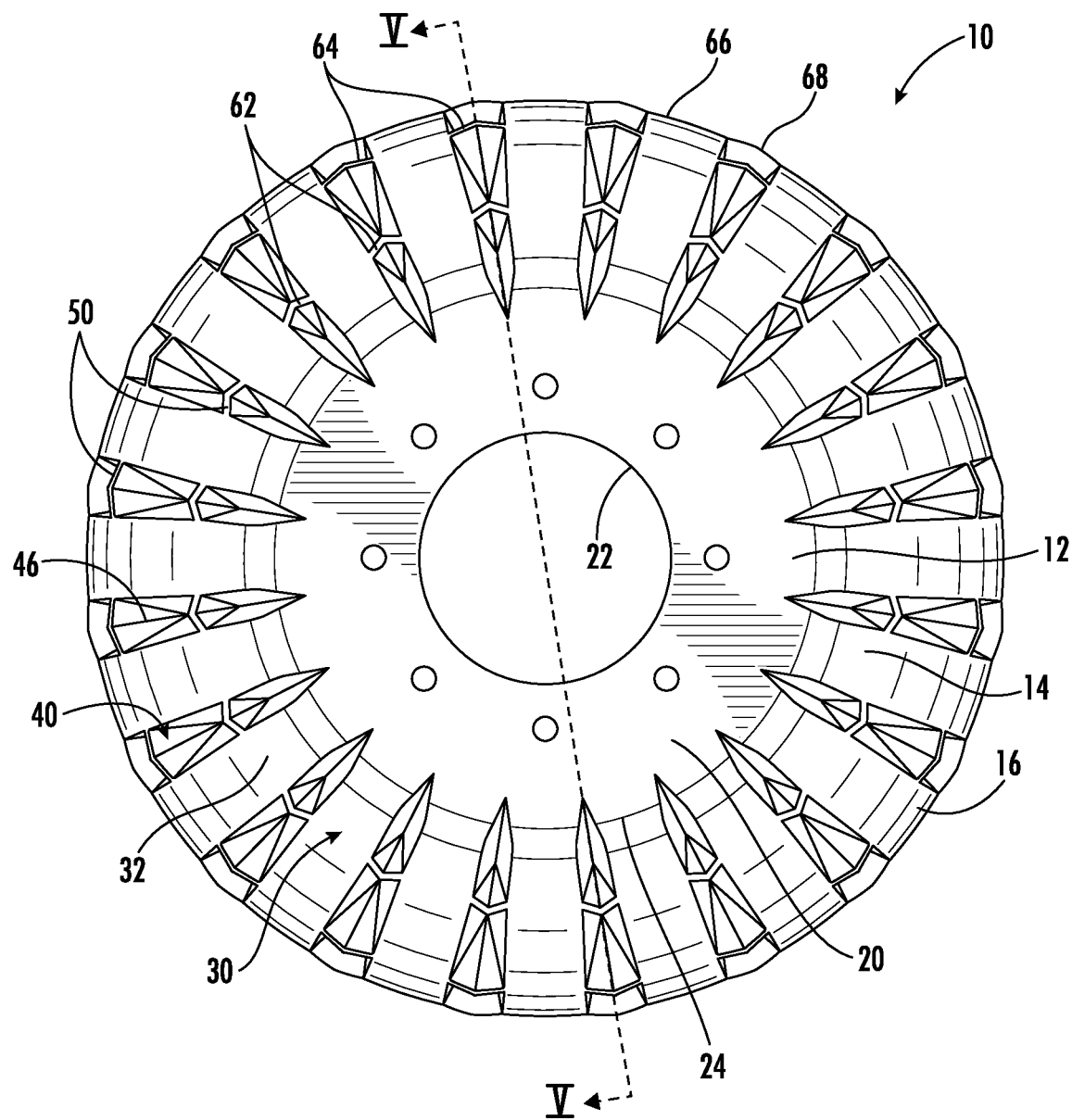
FIG. 4 shows an front view of the drive cup of FIG. 1.
Figure 5:
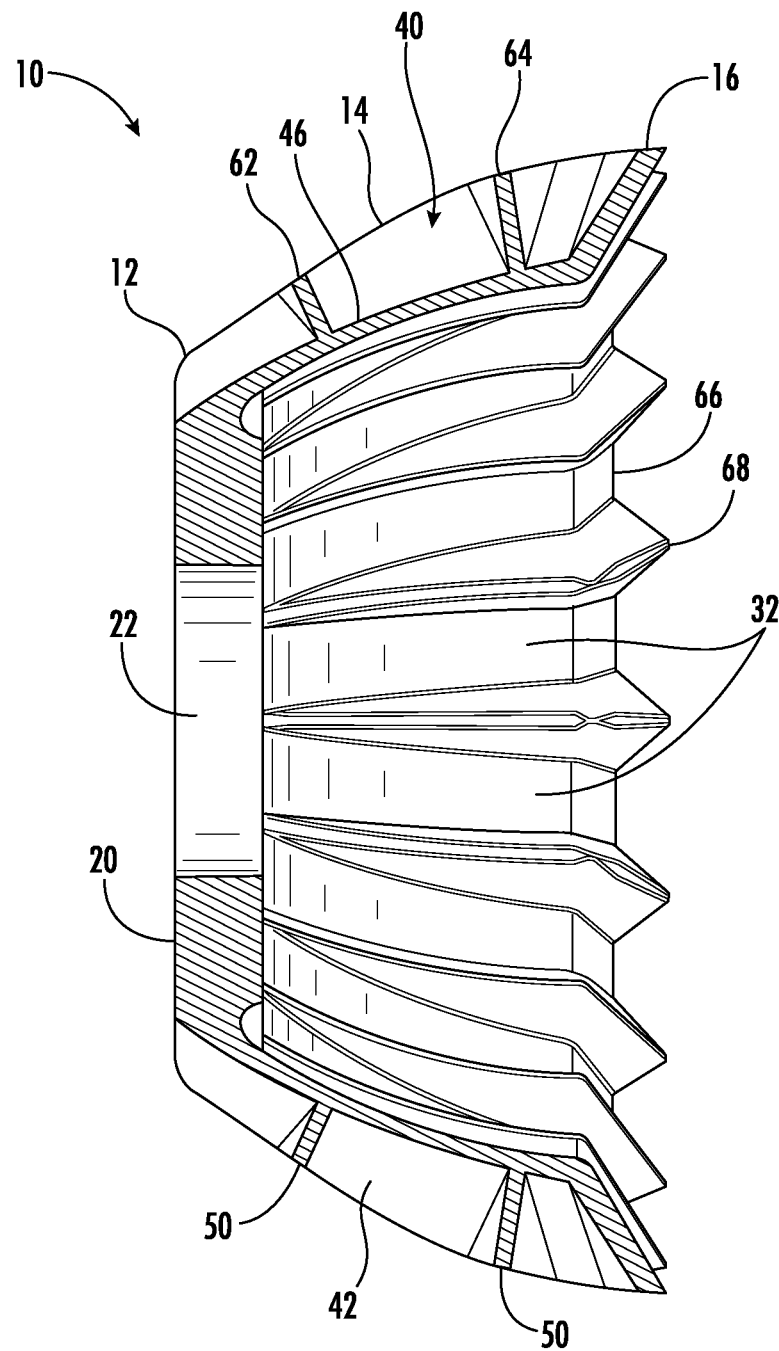
FIG. 5 shows a cross-sectional view of the drive cup along line V-V of FIG. 4.

A drive cup 10 for a pipeline inspection gauge is shown in FIGS. 1-5. The drive cup 10 includes a front portion 12, a sidewall 14, and a rear portion 16. The sidewall 14 includes a generally frustoconical outer surface 30 defined along a central axis 18. A plurality of axial channels 40 are formed in the sidewall 14. Each of the axial channels 40 includes one or more bridges 50 that extend circumferentially from one side to another side of the associated channel. As explained in further detail herein, the channels 40 are configured to move between an expanded state and a contracted state when the outer surface 30 of the cup 10 engages different pipeline dimensions. In each state, the bridges 50 assist in maintaining a seal between the outer surface 30 of the cup 10 and the inner surface of the pipeline.

The drive cup 10 is a unitary component wherein all of the parts are integrally formed together, such as by molding. Accordingly, the drive cup 10 may be considered to be monolithic such that various components of the cup are non-removable from other components without destruction of the cup as a whole. The material that forms the cup 10 is resilient, flexible, generally heat-resistant, oil-resistant, and impervious to fluid. In at least one embodiment, the cup 10 is comprised primarily or entirely of an elastomeric material, such as polyurethane. However, it will be recognized that the cup 10 may alternatively be formed of different or additional materials, such as natural rubbers or any of various polymer materials. In at least one embodiment the cup 10 may include a metallic skeleton that provides additional support structures which are over-molded with the elastomer or other material.

Figure 10:
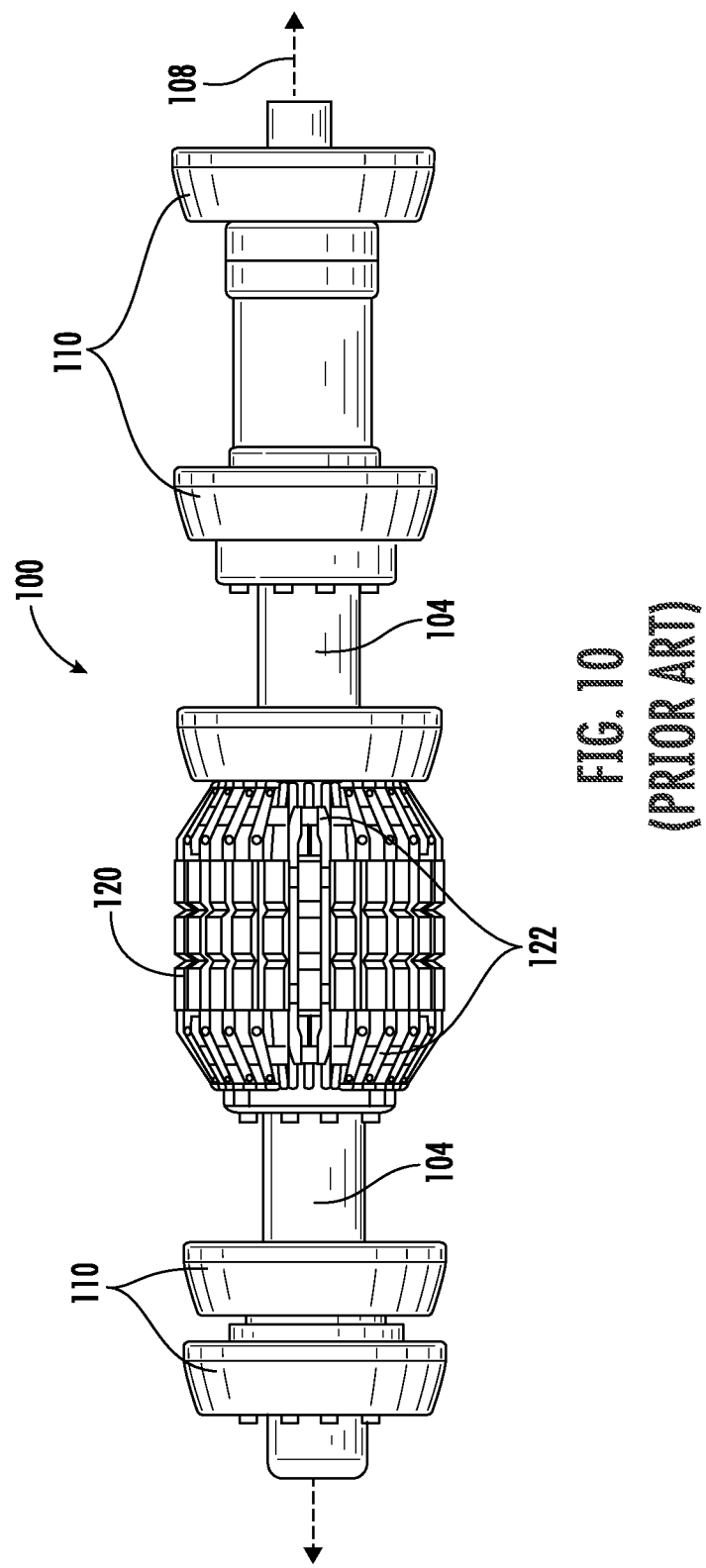
FIG. 10 shows a conventional pipeline inspection gauge configured to receive the drive cup of FIG. 1 or FIG. 8.

The front portion 12 of the drive cup 10 is generally circular or cylindrical in shape and includes a face 20 with a central hub 22. The face 20 is generally planar with a circular outer perimeter 24. Front ends of the channels 40 open into the face 20 along the outer perimeter 24, forming indentations along the outer perimeter 24 of the face 20. The hub 22 is centrally located on the face and configured to receive the body of the pig (e.g., body 104 of FIG. 10). The hub 22 is sealed against the body of the pig such that fluids, such as oil and gas, are prevented from passing through the hub 22. While the embodiment of the drive cup 10 disclosed herein includes the hub 22, it will be recognized that in at least some embodiments, the drive cup 10 does not include a hub 22.

The sidewall 14 of the drive cup 10 has a generally frustoconical outer surface 30. It will be recognized that the frustoconical outer surface 30 does not define a frustum of a perfect cone but instead refers to a surface that is generally cone shaped with the front portion having a smaller diameter than the rear portion. Also, it will be recognized that the generally frustoconical outer surface 30 also includes numerous surface irregularities, as described herein.

The sidewall 14 includes plurality of ribs 32 separated by a plurality of channels 40. Each rib 32 is somewhat curved and extends axially and radially away from the front portion 12 of the cup 10, along the frustoconical surface of the sidewall 14, until it reaches the rear portion 16 of the cup 10. The ribs 32 are arranged in a circumferential manner and evenly spaced around the entire circumference of the cup 10. Each rib 32 includes a generally smooth outer surface that is configured to seal against the inner surface of a pipe at any of a plurality of different diameters defined along the length of the rib 32. In other words, the cross-sectional shape of the surface of the rib 32 is that of an arc, with the radius of the arc changing along the various axial positions of the rib 32 between the front portion 12 and the rear portion 16 of the cup 10.

Axial channels 40 (which may alternatively be referred to as axial "grooves") are formed between each of the ribs 32 on the sidewall 14. Like the ribs 32, the axial channels 40 also extend between the front portion 12 and the rear portion 16 of the cup 10. Each of the axial channels 40 is generally V-shaped in cross-section with two angled walls 42, 44. A valley line 46 is defined along the length of the channel 40 such that it extends along the inner portion of the two angled walls 42, 44. The V-shaped cross-section of each channel 40 may be considered to define a top and a bottom of each channel, wherein the bottom of the channel is at the tip of the "V" and the top of the channel is opposite the tip at the wide end of the "V." Each of the axial channels 40 has a radial depth from top to bottom that is greater than the radial depth of the adjacent ribs 32. Furthermore, each of the channels 40 may be considered to have a width that is defined by the distance between the two angled walls 42, 44 (accordingly, the width of the channel is greater at the top than at the bottom). The width of the channels gradually tapers from a wider first width at the rear portion 16 of the cup 10 to a narrower second width at the front portion 12 of the cup 10. As explained in further detail below, the V-shaped structure of the axial channels 40 allows the angled walls 42, 44 to fold along the valley line 46 such that the channels 40 collapse inwardly and the ribs 32 are drawn closer together when the cup 10 is in a collapsed state. Conversely, when the cup 10 is in an expanded state, the channels open and the ribs 32 are positioned at a greater distance from one another. It will be recognized that while one configuration for the axial channels has been disclosed herein, various other configurations are also possible. For example, while the valley line 46 is disclosed herein as being a well-defined crease, in at least some embodiments, the valley line 46 may be provided by a small radius or somewhat flattened bottom portion. As yet another example, while the channels are described herein as gradually tapering from a wider the rear portion to a narrower front portion, in at least some embodiments the width of the channel does not taper. Also, in at least some embodiments, the axial channels may not extend completely from the front portion to the rear portion of the cup, and instead begin in a middle portion of the cup and extend from the middle portion toward the rear portion or from the middle portion toward the front portion.

A plurality of bridges 50 are positioned in each of the axial channels 40. Each of the bridges 50 extends the entire radial depth of the associated channel 40 from the valley line 46 to the radially outward edge of the channel 40. Each of the bridges also extends circumferentially across the associated channel 40 and provides a connection from one rib 32 on one side of the channel to an adjacent rib on an opposite side of the channel. In other words, the bridges 50 traverse the axial channels and provide a connection from one side of the channel to an opposite side of the channel such that the outer surface 30 of the cup 10 is smooth and uninterrupted when moving along the bridge 50 between adjacent ribs 32. As a result, there are no surface irregularities between adjacent ribs 32 along the path provided by the bridge 50 on the outer surface 30 of the cup 10. Each of the bridges 50 may also be considered to split the channel into different axial sections, including one section on one axial side of the bridge and another axial section on a different axial side of the bridge. While the bridges described herein as extending "circumferentially" across the channel, it will be recognized that this circumferential extension is not limited to a perfectly circumferential traversal of the channel and instead refers to a traversal from one side of the channel to the other. As such the bridge 50 may include various portions with axial components as well as circumferential components.

In the embodiments disclosed herein, the bridges 50 are all chevron-shaped and each bridge 50 includes a first panel 52, a second panel 54, and a tip 56. The first panel 52 provides a first portion of the bridge that extends inwardly for the entire depth of the channel 40 (i.e., from a top of the channel to a bottom of the channel). The second panel 54 provides a second portion of the bridge 50 that extends inwardly from the entire depth of the channel 40. The first panel 52 and the second panel 54 are both oriented at an angle within the channel and meet at the tip 56. The tip 56 defines a mid-section for the bridge that extends radially into the channel 40. When viewed from the outer surface 30 of the cup 10, each tip 56 points away from the front portion 12 and toward the rear portion 16 of the cup 10. The end of the first panel 52 that is opposite the tip 56 (and closer to the front portion 12 of the cup) is connected to a first rib 32 on one side of the channel 40 and defines a first end of the bridge 50. Similarly, the end of the second panel 54 that is opposite the tip 56 (and closer to the front portion 12 of the cup) is connected to a second rib 32 on an opposite side of the channel 40 and defines a second end of the bridge 50. Both the first panel 52 and the second panel 54 are impervious to fluid. Accordingly, the bridge 50 not only provides a circumferential path across the channel 40, but also blocks fluid from flowing through the channel 40.

The bridges 50 include forward bridges 62 and middle bridges 64 positioned in each of the channels 40 of the cup 10. The forward bridges 62 are positioned in the channels 40 such that they are closer to the front portion 12 of the cup 10 and all arranged along a common circumference of the frustoconical sidewall 14. For example, in at least one embodiment the forward bridges 62 are all positioned along a circumference of the sidewall 14 that is associated with a six inch diameter at the outer surface 30.

The rear bridges 64 are positioned closer to the rear portion 16 of the cup 10 and all arranged along another common circumference of the frustoconical sidewall 14. For example, in at least one embodiment the middle bridges 64 are all positioned along a circumference of the sidewall that is associated with an eight inch diameter at the outer surface 30.

While the embodiments disclosed herein include forward bridges 62 and rear bridges 64 in each of the channels 40, it will be recognized that in various embodiments of the cup 10 fewer or additional bridges 50 may be provided in each of the channels 40. For example, each channel may alternatively include one, three, four or more bridges, each of the bridges associated with a specific circumference or circumferential range such that the bridges 50 are configured to seal the outer surface 30 of the cup against the inner surface of a pipeline having a certain diameter or range of diameters. Additionally, it will be recognized that while one configuration of the bridges 50 has been disclosed herein, various other configurations are also possible. For example, the chevron-shaped bridges may point a different direction that that shown in the figures (e.g., toward the front portion instead while the rear portion of the cup). Also, the bridges 50 could be of a different shape, such as a curved or arc shape (e.g., similar to a water dam). As yet another example, while the forward bridges 62 are disclosed herein as being slightly smaller in size than the rear bridges 64, in at least some embodiments, all of the bridges have the same size.

The rear portion 16 of the cup 10 defines a greater diameter than the front portion 12 of the cup 10. The rear portion includes a rim 66 which separates the outer surface 30 from the inner surface of the cup 10. The rear portion 16 further includes a plurality of chevron-shaped sections 68 at the end of each channel 40. These sections 68 are similar in shape to the bridges 50 and define a closed end of each channel 40. Because these sections 68 are arranged along the rim 66, they are positioned along a circumference of the cup 10 that is slightly greater than the circumference than that associated with the rear bridges 64.

Figure 6:
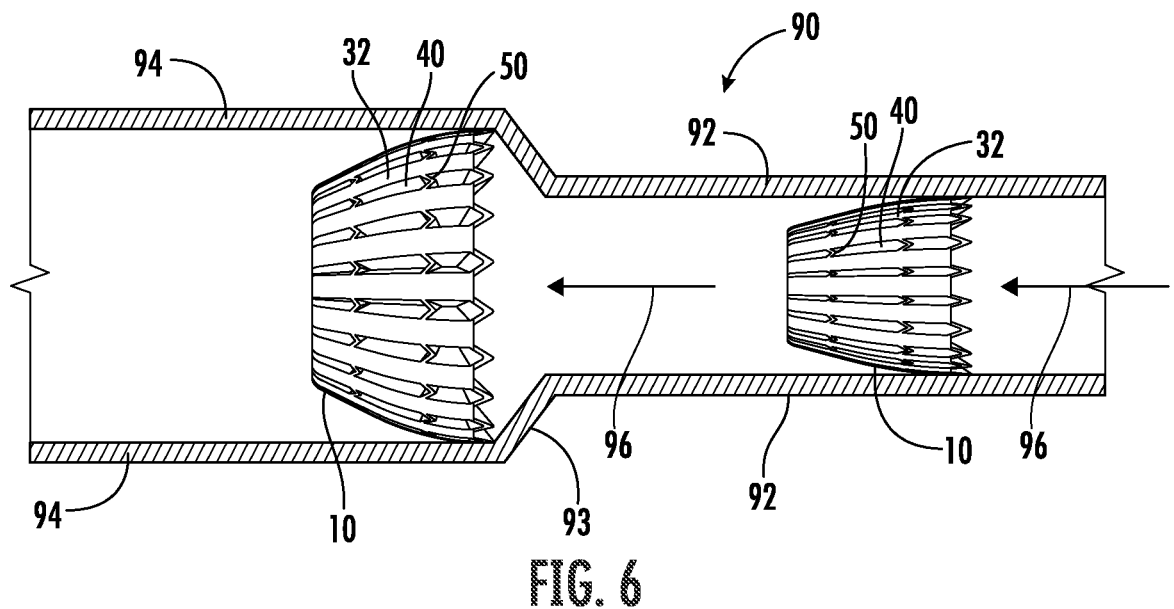
FIG. 6 is an illustration showing movement of the drive cup of FIG. 1 through a pipeline having multiple diameters.
Figure 7A:
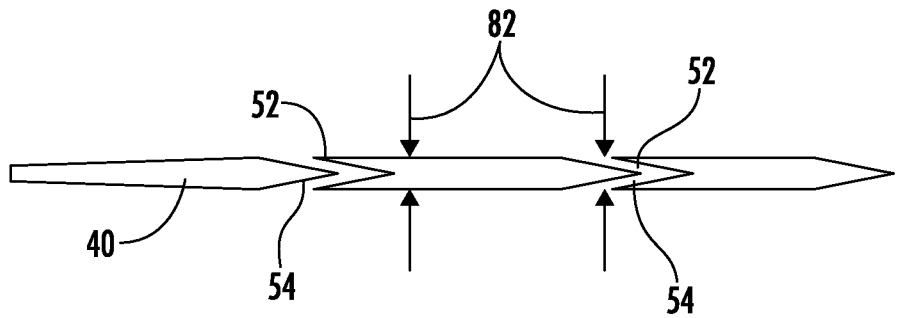
FIG. 7A is an illustration of a channel of the drive cup of FIG. 1 when the channel is in a compressed state.
Figure 7B:
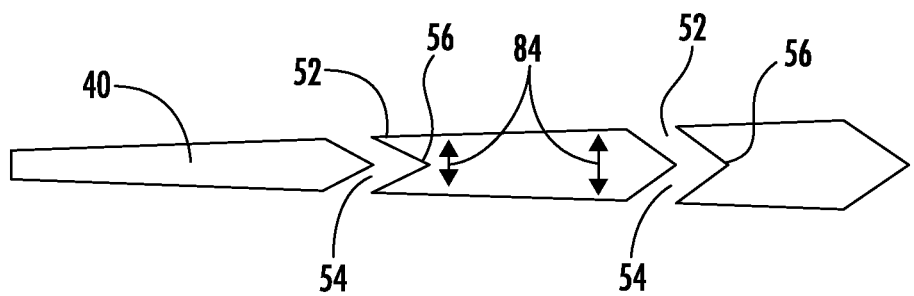
FIG. 7B is an illustration of the channel of FIG. 7A when the channel is in an expanded state.

With reference now to FIGS. 6-7B, operation of the cup 10 within a pipeline is disclosed. As shown in FIG. 6, a pipeline 90 may include different sections, including a smaller diameter section 92 (e.g., a six-inch diameter section) shown on the right side of the illustration, and a larger diameter section 94 (e.g., an eight-inch diameter section) shown on the left side of the illustration. When the cup 10 is in the smaller diameter section 92, the cup 10 is in a collapsed state wherein all of the ribs 32 are closer together, the channels 40 are narrowed and/or completely closed, and the panels 52, 54 of the bridges 50 are folded at the tips 56. It will be recognized that while one exemplary size and shape for the cup is shown in the figures and disclosed herein, various other sizes and shapes are also possible. For example, the dual-diameter cup may be further configured for use with different diameter pipelines or pipelines with more than just two diameters (e.g., six inch, eight inch, ten inch, twelve inch, etc., or any of various other diameters).

FIG. 7A shows an illustration of one of the channels 40 when the cup is in the compressed state. As noted by the arrows 82, the ribs 32 on opposing sides of the channel 40 are forced closer together in this state, the bridges fold, and the circumferential width of the channel 40 is narrowed. In this compressed state, the outer surface 30 of the cup 10 associated with the forward bridges 62 forms a seal with the inner surface of the pipeline 90. Because the material that forms the cup 10 is impervious, and because the channels 40 are all blocked by the bridges 50, fluid pressure in the pipeline propels the cup forward, as noted by the arrows 96. In particular, the outer surface 30 of the cup 10 seals the pressure on the front of the cup from the area behind the cup resulting in a difference in pressure across the cup, and this difference in pressure across the cup propels the cup (and the associated pig) through the pipeline 90.

With continued reference to FIGS. 6-7B, as the cup 10 moves forward in the pipeline 90 (i.e., from right to left), the cup 10 moves through a transition region 93 and encounters the larger diameter section 94 of the pipeline 90, shown on the left side of the illustration. When the cup 10 moves into the larger diameter section 94, it changes to an expanded state. In particular, when the cup 10 moves into the larger diameter section 94, the force of the fluid against the inner surface of the cup 10, and the resilient nature of the bridges 50, forces the channels 40 to expand and the ribs 32 are moved further apart. FIG. 7B shows an illustration of one of the channels 40 when the cup is in the expanded state. As noted by the arrows 84, in the expanded state the bridges 50 unfold, the ribs 32 on opposing sides of the channel 40 are forced apart, and the circumferential width of the channel 40 is enlarged. In this expanded state, the outer surface 30 of the cup 10 associated with the rear bridges 64 forms a seal with the inner surface of the pipeline 90.

In view of the foregoing, it will be recognized that the drive cup 10 described herein is capable of moving through a pipeline 90, and the outer surface 30 of the cup 10 is configured to seal against the inner surface of the pipeline 90 at several different diameters. For example, the cup 10 may move between smaller diameter sections and larger diameter sections of the pipeline time and time again, all while maintaining a good seal against the pipe such that the drive cup 10 and any components attached thereto are propelled through the pipeline 90. The drive cup 10 is configured for use with a pipeline inspection gauge such as the exemplary pipeline inspection gauge 100 of FIG. 10, wherein the improved cup 10 is used instead of the conventional cups 110. The improved drive cup 10 may be used in association with new pigs or may be retrofitted onto existing pigs. Moreover, the drive dup 10 may be configured for use with any of various types of pigs, including gauging tool pigs, cleaning pigs, and smart pigs.

Figure 8:
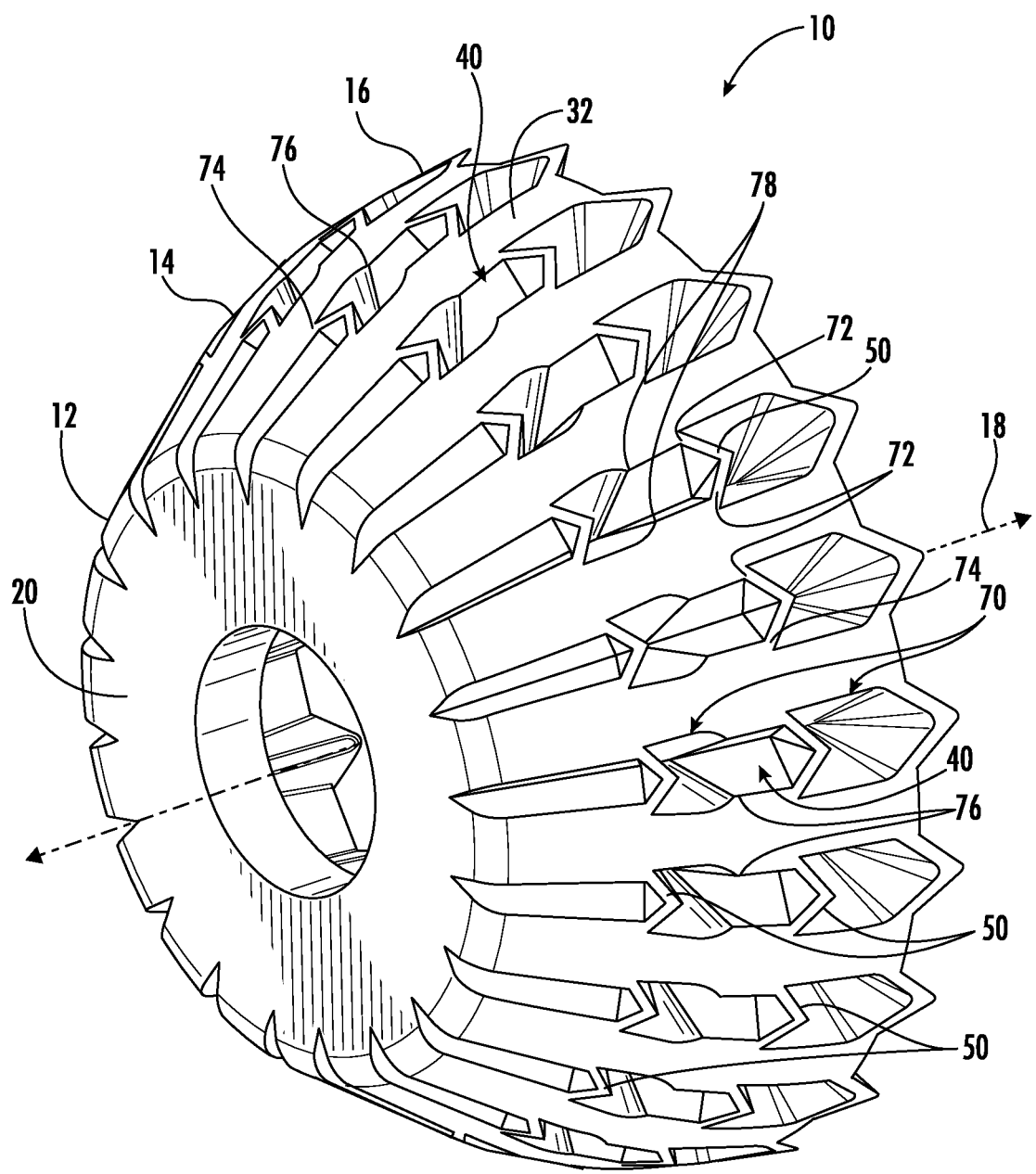
FIG. 8 shows a front perspective view of another embodiment of a drive cup for a pipeline inspection gauge.
Figure 9:
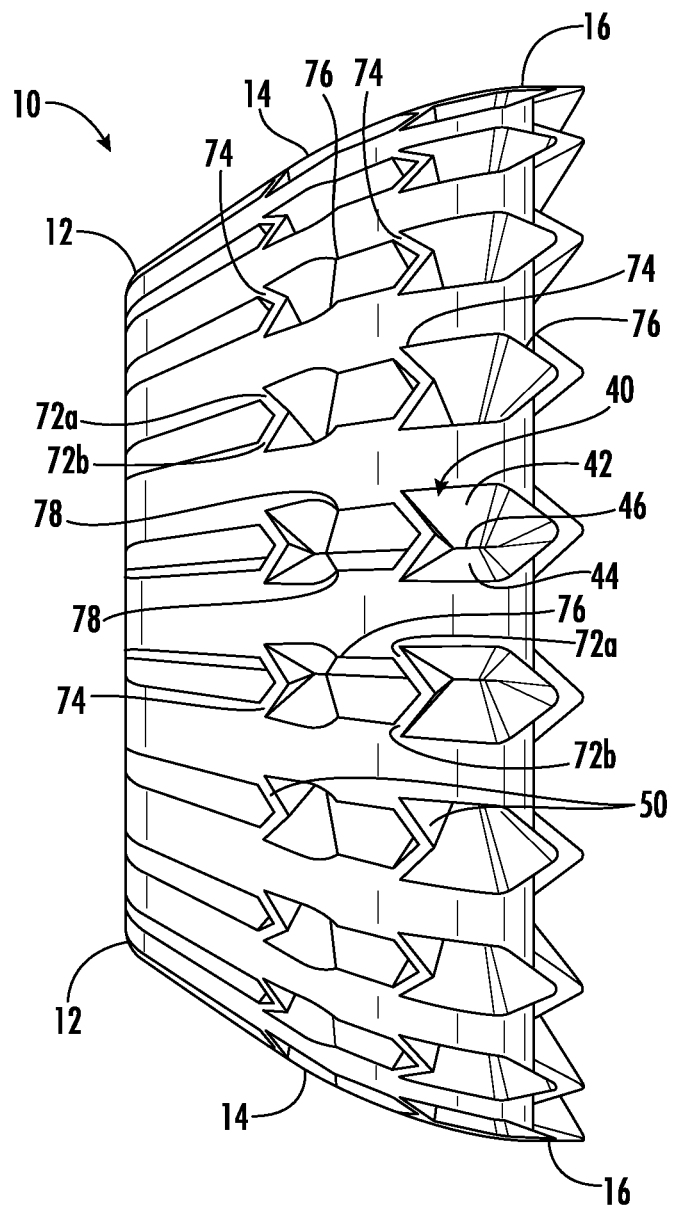
FIG. 9 shows a side view of the drive cup of FIG. 8.

While one embodiment of the drive cup has been shown and described above in association with FIGS. 1-5 (with operation described in association with FIGS. 6-7B), it will be recognized that various alternative embodiments of the drive cup are also possible. For example, FIGS. 8 and 9 show a second embodiment of the drive cup wherein each of the channels 40 includes one or more enlarged portions 70. Each enlarged portion 70 is associated with a location in the channel 40 where one of the bridges 50 is positioned. The angled walls 42, 44 of the channel 40 are differently shaped at the enlarged portions 70 than at other stretches of the channel 40. For example, the angled walls 42, 44 at the enlarged portions 70 are wing-like shapes with a truncated end 74 and a tip end 76. The truncated end 74 of the enlarged portion 70 is defined by two circumferentially opposed shoulders 72 on opposite sides of the channel 40. The tip end 76 of the enlarged portion 70 is defined by opposing points 78 where the curved edges on the outer surface 30 meets the straight edges that extends radially into the channel down to the valley line 46. Each enlarged portion 70 defines a greater circumferential width across the channel 40 than the width of the channel on either axial side of the enlarged portions 70 (i.e., the width of the channel 40 is narrower axially outward from the opposed shoulders 72 and the points 78 than within the enlarged portion 70). Additionally, the enlarged portion 70 is wider at the truncated end 74 than at that tip end 76. In other words, the width of the channel at the shoulders 72 is greater than the width of the channel 40 at the points 78.

In the embodiment of FIGS. 8 and 9, each of the chevron-shaped bridges 50 is positioned in one of the enlarged portions 70 of the channel 40. To this end a first end 58a of each chevron-shaped bridge 50 is joined to a first shoulder 72a, and a second end 58b of the chevron-shaped bridge 50 is joined to a second shoulder 72b in the channel 40. The shoulders 72a and 72b provide a clearance for the bridge 50 within the channel 40. Therefore, when the cup 10 is in a collapsed state, even if the ribs 32 are drawn completely together along some stretches of the channel 40, the enlarged portions 70 of the channels 40 do not completely close and still provide space for the bridges 50 to fold into their collapsed state. This is different from the embodiment of FIGS. 1-5 wherein no clearance is allotted for the bridges 50, and therefore the channels 40 cannot completely close when the cup 10 is in a collapsed state.

The two different embodiments disclosed herein provide different advantages for the cup 10. In particular, in the first embodiment of FIGS. 1-5, the design is simpler and easier to mold. However, in the second embodiment of FIGS. 8-9, the enlarged portions 70 allow the channels 40 to collapse completely such that the cup 10 may be compressed into its smallest possible configuration. In contrast to the second embodiment, the channels in the first embodiment are prevented from fully closing because there is no extra space to accommodate the collapsed bridges 50. Therefore, while the second embodiment of FIGS. 8-9 is somewhat more difficult to produce, it has additional advantageous functionality over the first embodiment of FIGS. 1-5.

The foregoing detailed description of one or more embodiments of the drive cup for a pipeline inspection gauge has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

The invention claimed is:

1. A pipeline inspection gauge comprising:
a body defining an axis;
a sensor module coupled to the body; and
a drive cup coupled to the body, the drive cup including an outer surface with a plurality of axial channels, each of the axial channels including at least one bridge positioned therein that extends circumferentially across the channel, wherein each of the axial channels defines a v-shaped cross-section and extends in an axial direction along the outer surface, wherein the bridge extends radially inwardly from a top of the channel to a bottom of the channel.

2. The pipeline inspection gauge of claim 1 wherein the at least one bridge includes at least two angled panels.

3. The pipeline inspection gauge of claim 2 wherein the at least one bridge is a chevron-shaped bridge.

4. The pipeline inspection gauge of claim 3, wherein the outer surface of the drive cup includes a front portion and a rear portion, and wherein the chevron shaped bridge defines a tip such that the chevron shaped bridge points away from front portion and toward the rear portion.

5. The pipeline inspection gauge of claim 4 wherein each of the axial channels includes two circumferentially opposed shoulders such that the channel is wider on one side at the opposed shoulders and narrower on an opposite side of the opposed shoulders, and wherein a first end of the chevron-shaped bridge is joined to a first shoulder and a second end of the chevron-shaped bridge is joined to a second shoulder.

6. The pipeline inspection gauge of claim 1 wherein each channel gradually tapers from a wider first width at a portion of the cup to a narrower second width at a front portion of the cup.

7. The pipeline inspection gauge of claim 1 wherein each axial channel includes at least two bridges, the two bridges including a smaller first chevron shaped bridge closer to a front portion of the cup and a larger second chevron shaped bridge closer to a rear portion of the cup.

8. The pipeline inspection gauge of claim 7 wherein a diameter of the cup increases between a six-inch diameter portion associated with the first chevron shaped bridge and an eight-inch diameter portion associated with the second chevron shaped bridge.

9. The pipeline inspection gauge of claim 1 wherein each axial channel opens into a planar front surface of the drive cup.

10. The pipeline inspection gauge of claim 1 wherein the drive cup is a monolithic component.

11. The pipeline inspection gauge of claim 10 wherein the drive cup is comprised of an elastomeric material and the outer surface of the drive cup is frustoconical in shape.

12. The pipeline inspection gauge of claim 11 wherein the drive cup is comprised of polyurethane.

13. A drive cup for a pipeline inspection gauge, the drive cup comprising:
a frustoconical outer surface having a front portion and a rear portion, the front portion defining a smaller diameter than the rear portion;
a plurality of axial channels defined on the outer surface, each of the axial channels defining a radial depth; and
a plurality of bridges positioned in each of the axial channels, each of the bridges extending circumferentially across the channel and radially for the depth of the channel.

14. The drive cup of claim 13 wherein each of the bridges includes a first portion configured to pivot relative to a second portion within the channel.

15. The drive cup of claim 14 wherein each of the bridges is chevron-shaped with a tip defined at an intersection of the first portion and the second portion.

16. The drive cup of claim 15 wherein the plurality of bridges include (i) a first set of bridges arranged circumferentially in the axial channels at a first diameter of the frustoconical outer surface, and (ii) a second set of bridges arranged circumferentially in the axial channels at a second diameter of the frustoconical outer surface.

17. The drive cup of claim 16 wherein each of the plurality of axial channels includes a first set of shoulders associated with the first diameter of the frustoconical outer surface and a second set of shoulders associated with the second diameter of the frustocontical outer surface, wherein ends of a first bridge are joined to the first set of shoulders and ends of a second bridge are joined to the second set of shoulders.

18. A method of propelling a pipeline inspection gauge through a pipeline, the method comprising:
inserting the pipeline inspection gauge into the pipeline, the pipeline inspection gauge including a drive cup having an outer surface with a plurality of axial channels, a first set of bridges extending across the axial channels at a first diameter portion of the outer surface, and a second set of bridges extending across the axial channels at a second diameter portion of the outer surface;
engaging the outer surface of the drive cup including the first set of bridges with a first inner surface of the pipeline;
allowing the drive cup to move within the pipeline as a result of a fluid pressure on the drive cup; and
engaging the outer surface of the drive cup including the second set of bridges with a second inner surface of the pipeline, wherein the second inner surface of the pipeline is defined by a different diameter than the first inner surface.

19. The method of claim 18 wherein the axial channels and second set of bridges are in a collapsed position when the first set of bridges engage the first inner surface of the pipeline, and wherein the axial channel and the second set of bridges are in an expanded position when the second set of bridges engage the second inner surface of the pipeline.

20. A pipeline inspection gauge comprising:
a body defining an axis;
a sensor module coupled to the body; and
a drive cup coupled to the body, the drive cup including an outer surface with a plurality of axial channels, each of the axial channels including at least one bridge positioned therein that extends circumferentially across the channel, wherein the at least one bridge is a chevron-shaped bridge including at least two angled panels, wherein the outer surface of the drive cup includes a front portion and a rear portion, and wherein the chevron shaped bridge defines a tip such that the chevron shaped bridge points away from front portion and toward the rear portion, and wherein each of the axial channels includes two circumferentially opposed shoulders such that the channel is wider on one side at the opposed shoulders and narrower on an opposite side of the opposed shoulders, and wherein a first end of the chevron-shaped bridge is joined to a first shoulder and a second end of the chevron-shaped bridge is joined to a second shoulder.

21. A pipeline inspection gauge comprising:
a body defining an axis;
a sensor module coupled to the body; and
a drive cup coupled to the body, the drive cup including an outer surface with a plurality of axial channels, each of the axial channels including at least two bridges positioned therein that extend circumferentially across the channel, the two bridges including a smaller first chevron shaped bridge closer to a front portion of the cup and a larger second chevron shaped bridge closer to a rear portion of the cup.

* * * * *